March 28, 1967  J. H. GODBY  3,310,902

SONIC FISHING LURE

Filed Nov. 27, 1964  2 Sheets-Sheet 1

INVENTOR
JOHN H. GODBY

BY

Richard K. MacNeill

March 28, 1967 J. H. GODBY 3,310,902
SONIC FISHING LURE
Filed Nov. 27, 1964 2 Sheets-Sheet 2
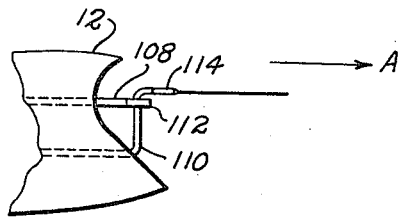
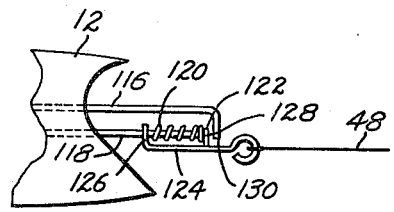
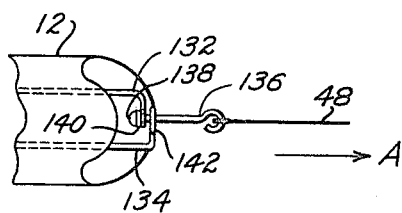
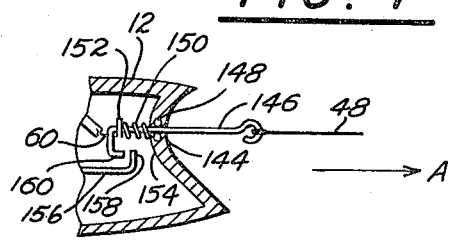
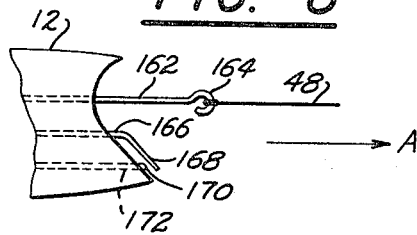
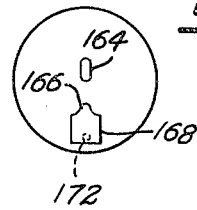
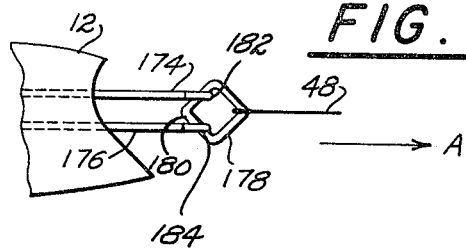
INVENTOR
JOHN H. GODBY
BY
Richard K. Macmill

United States Patent Office 3,310,902
Patented Mar. 28, 1967

3,310,902
SONIC FISHING LURE
John H. Godby, 103 George St., Yuma, Ariz. 85364
Filed Nov. 27, 1964, Ser. No. 414,268
7 Claims. (Cl. 43—17.1)

The present invention relates to a sonic fishing lure and more particularly to a sonic fishing lure having novel means operable by tension of a fishing line to control operation of a buzzer internally of the lure.

It has been a problem to provide a sonic fishing lure which may simulate noises made by various live bait and to control the initiation of the noises at will by tension of the fishing line connected to such a lure.

According to the invention, a sonic fishing lure is provided with a switch operable by tension of a line in connection with the lure so that the operator of the lure may apply a pulling action on the lure at which time a switch is closed which thereby causes sonic vibrations from the lure by actuating a battery operated buzzer therein.

Another novel feature of the invention is the provision of a thermal flasher switch utilized intermittently of the lure so that the buzzer may be operated at certain time intervals automatically if desired.

Another object of the invention is to provide a sonic fishing lure having a very simple and compact switching means coupled to a fishing line and operable in response to tension applied to the line.

Still another object of the invention is to provide a sonic fishing lure having novel features of construction which readily permit the disassembly of the lure for replacing the battery therein or for various maintenance work in connection thereof.

A further object of the invention is the provision of a sonic fishing lure having automatic intermittent sonic patterns emitting therefrom.

Yet another object is to provide a sonic fishing lure which is simple, inexpensive, and requires a minimum of maintenance and adjustment.

Other objects and many of the attendant advantages of the present invention will be more readily apparent with reference to the following detailed description taken in conjunction with the drawings in which like reference numerals designate like parts thereof and wherein:

FIG. 4 is a fragmentary side elevational view of the front end of a sonic fishing lure in accordance with the invention and showing a modified line tension actuated switch mechanism;

FIG. 5 is a view similar to FIG. 4 and showing a further modified switch mechanism;

FIG. 6 is a fragmentary top or plan view of a front end of a fishing lure in accordance with the present invention showing another modified switching mechanism;

FIG. 7 is a fragmentary axial sectional view of the front end of a fishing lure according to the present invention and showing another modified switch mechanism in connection therewith;

FIG. 8 is a view similar to FIG. 4 but showing a water pressure actuated switch mechanism which is responsive to forward movement of the lure in the water;

FIG. 9 is an end view of the modification shown in FIG. 8; and

FIG. 10 is another view similar to FIG. 4 but showing an additional modified switch mechanism of the invention.

Figure 1:
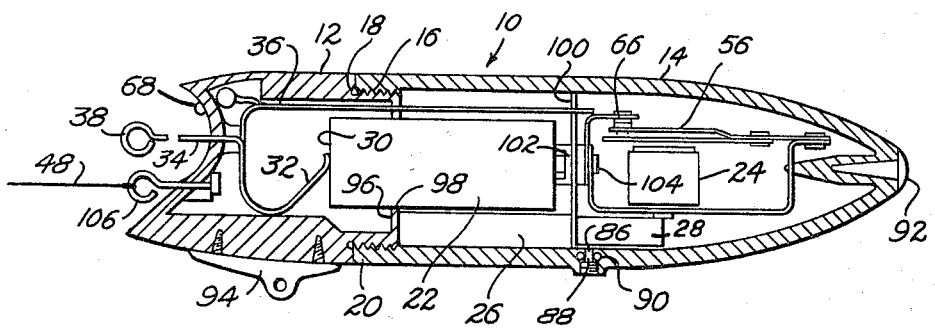
FIG. 1 is a longitudinal sectional view of a sonic lure in accordance with the present invention showing parts and portions in elevation to facilitate the illustration.

As shown in FIG. 1 of the drawings, the sonic fishing lure of the invention employs a hollow lure body 10 composed of a frontal section 12 and a rearward section 14. These sections are interconnected by screw threads 16 adjacent to which an O-ring 18 provides a seal adjacent to a shoulder joint 20 between the forward and rearward sections 12 and 14.

The body sections 12 and 14 are hollow and they house a battery 22, buzzer 24, thermal flasher switch 26 and microswitch 28 together with electrical conductors, as will be hereinafter described.

Engaging one end 30 of the battery 22 is a resilient terminal 32 which is provided with a shank portion 34 extending through the front end of the forward body section 12. This conductor shank 34 is cast in the body section 12 during the injection molding thereof and thus a hermetic seal is formed around the shank 34 rendering this connection water tight.

Figure 2:
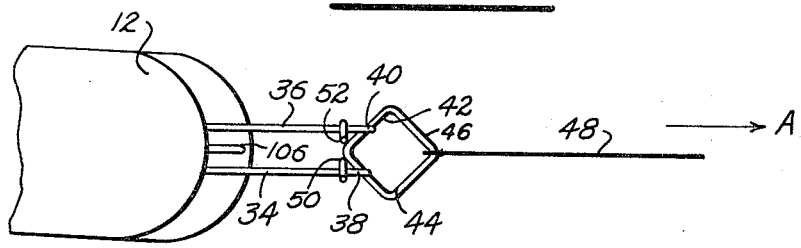
FIG. 2 is a fragmentary top or plan view of the frontal portion of the fishing lure of the invention showing details of the line tension switching mechanism.

Another resilient conductor 36, as shown in FIG. 2, extends through the frontal portion of the body section 12 in a similar manner to that previously described in connection with the conductor 34 whereby both electrical conductors 34 and 36 are hermetically sealed in the frontal portion of the body section 12. The shank 34 is provided with a loop 38 while the conductor 36 is provided with a loop 40. Extending through these loops 38 and 40 is a loop 42 of non-conducting material such as nylon. This loop 42 is provided with rearwardly converging portions 44 and 46 which are disposed at an angle to each other in order to provide cam action with respect to the loops 38 and 40 to force the conductors 34 and 36 to make electrical contact, as will be hereinafter described.

Connected to the non-conducting loop 42 is a conventional fishing line 48 disposed to apply force in the direction of an arrow A as shown in FIG. 2 of the drawings. This force in the direction of the arrow A as shown in FIG. 2 is referred to herein as line tension.

When line tension is applied to the loop 42 of the angularly disposed portions 44 and 46 of the loop tend to cam the loops 38 and 40 of the conductors 34 and 36 toward each other whereupon contact portions 50 and 52 coupled to the loops 38 and 40 engage each other and complete a circuit to cause operation of the buzzer 24, as will be hereinafter described.

Figure 3:
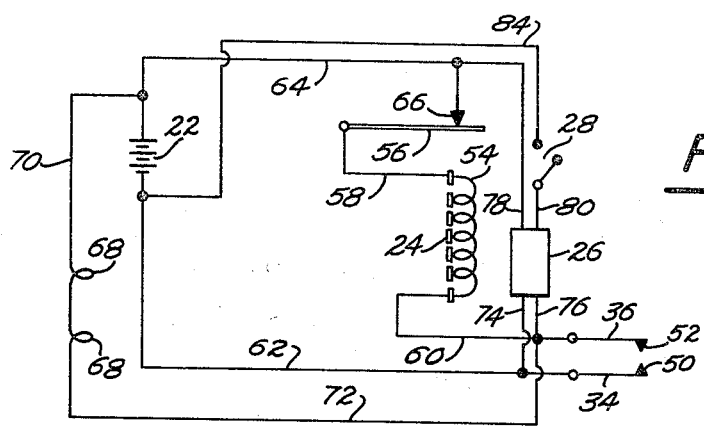
FIG. 3 is a diagrammatic view of electrical wiring in connection with the sonic lure of the invention.

As shown in FIG. 3 of the drawings, the buzzer 24 is provided with a conventional electro-magnetic coil 54 adapted to attract a conventional breaker 56 which is electrically coupled by a conductor 58 to one end of the coil 54. The opposite end of the coil 54 is coupled by means of a conductor 60 to the switch element 52 of the conductor 36. The switch element 50 is coupled by means of a conductor 62 to one terminal of the battery 22 while the opposite terminal thereof is coupled by means of a conductor 64 to a switch element 66 adapted to be contacted by the member 56, as hereinbefore described.

A pair of eyes 68 are hermetically sealed in the frontal body member 12 and project therefrom. These eyes are small electric lamps adapted to be illuminatedd by power from the battery 22, as will be hereinafter described. A conductor 70 couples one terminal of the battery 22 to the electric lamp eyes 68 which are in series and a second conductor 72 is connected to the electric lamp eyes to the conductor 60 and switch element 52 whereby closing of the switch elements 50 and 52 completes a circuit from one terminal of the battery 22 through the conductor 70 and the conductor 72 to the switch element 52 and switch element 50 and through the conductor 62 back to the other terminal of the battery.

The thermal flasher switch 26 is disposed to operate as an intermittent switch to complete a circuit between conductors 74 and 76 while the thermal flasher switch 26 is energized through conductors 78 and 80. The switch 28 couples the conductor 80 with the conductor 84 extending to a connection with the conductor 62 and one terminal of the battery 22 while the conductors 64 extending from the opposite terminal are coupled to the conductor 78. Thus, the thermal flasher switch 26 may be energized by closing the switch 28.

The switch 28 is a microswitch having an actuating nib 86 engageable by a screw 88 operating in an O ring 90 in the rear body section 14. This screw 88 is screw threaded in the side wall of the rear body section 14 and may be rotated slightly in order to actuate the switch 28 so that the thermal flasher switch 26 will operate intermittently to cause intermittent buzzing of the buzzer 24.

A fixture 92 coupled to the rear end of the body section 14 is adapted to support a treble hook while another fixture 94 coupled to the lower side of the forward body section 12 adapted to support another treble hook.

The forward body section 12 is provided with a partition 96 having a central opening 98 therein for supporting the battery 22 concentrically in the housing 10 while a second partition 100 is provided with a terminal 102 engageable with one end terminal of the battery 22 while the opposite end terminal is engaged by the resilient conductor 32. This resilient conductor 32 holds the battery 32 securely against the terminal 102 supported by the partition 100. The buzzer 24 is supported on the partition 100 by a riveted portion 104 of the terminal 102. This terminal 102 is a conventional insulated terminal of the riveted type.

In operation, when it is desired to actuate the buzzer 24 only in accordance with line tension, the switch 28 is disposed in open position and the plug is cast into the water with the line 48 connected as in FIG. 2. Each time the line tension is applied in the direction of the arrow A, as shown in FIG. 2 of the drawings, the convergingly angular portions 44 and 46 of the insulated loop 42 force the contacts 50 and 52 together by deflecting the conductors 36 and 34 toward each other. Thus, a circuit is completed to the buzzer 24 through the battery 22 which causes buzzing action thereby attracting fish to the lure.

If it is desired to provide a combination of intermittent buzzing and/or controlled buzzing in accordance with line tension, the switch 28 is closed so that the thermal flasher intermittently makes and breaks a circuit to the buzzer 24. Thus, the lure buzzes continuously on an intermittent cycle. The line tension may cause the contacts 50 and 52 to close for a longer period of time so that intermittent buzzing may be accomplished by the thermal flasher switch 26. Line tension may be held for longer periods of time so that the buzzer operates intermittently with short pulses when there is no line tension and longer pulses of buzzer operation may be attained by continued application of line tension as hereinbefore described.

A wire loop 106 is provided in connection with the frontal body section 12 so that if it is desired to operate the thermal flasher switch 26 independently of line tension, the line may be coupled to the loops 106 so that during trolling operations the thermal flasher switch may operate individually by closing the switch 28. Thus, the lure when fixed for trolling buzzes intermittently in accordance with the cycle rate of the thermal flasher switch 26.

The eyes 68, as shown in FIG. 3 of the drawings, are disposed to be energized by closing of the contacts 50 and 52, as hereinbefore described, or may be energized in some other manner as will be obvious to those skilled in the art.

In the modification as shown in FIG. 4, conductors 108 and 110 project from the body section 12 at the frontal end thereof. The conductor 108 is provided with an open loop 112 and the conductor 110 extends through this loop and is concentrically disposed therein. A loop 114 on the conductor 110 provides a connection for the fishing line 48 to apply line tension in the direction of the arrow A. When line tension is supplied in the direction of the arrow A the conductor 110 is deflected and engages the inside of the loop 112 and thereby operates to close the circuit as shown in FIG. 3 of the drawings whereby the conductors 108 and 110 are coupled electrically in a similar fashion to the deflection of the conductors 34 and 36 causing engagement of the contact portions 50 and 52 thereof. Thus, the conductor 110 and the loop 112 are substituted for the contact portions 50 and 52 of the conductors 34 and 36.

In the modification as shown in FIG. 5 of the drawings, conductors 116 and 118 project from the body portion 12 in a similar manner to the projection of the conductors 34 and 36 hereinbefore described. A coil spring 120 is mounted on the conductor 118 and is abutted to a head portion 122 thereof.

A sliding member 124 is constructed of steel wire and is provided with a plate 126 having a central opening slidingly mounted over the conductor 118. This plate 126 engages one end of the spring 120 while the opposite end thereof is abutted to the head portion 122 fixed to the conductor 118.

A contact plate 128 is fixed to the sliding member 124 and is adapted to contact an angular end portion 130 of the conductor 116 when sufficient line tension is applied to the member 124 to deflect the spring 120 and permit the contact plate 128 to engage the portion 130.

In the modification as shown in FIG. 6 of the drawings, conductors 132 and 134 are similar to the conductors 34 and 36, hereinbefore described. These conductors are of resilient wire and a line connection loop member 136 is provided for connection of the line 48. This member 136 is provided with a head portion 138 abutted to one side of a loop 140 at the end of the conductor 132. The member 136 extends through an enlarged loop 142 of the conductor 134 so that when line tension is applied to the member 136 the loop 140 is deflected into engagement with the loop 142 thereby electrically connecting the conductors 132 and 134 so that they operate as a switch in equivalent fashion to the operation of the conductors 34 and 36, as hereinbefore described.

In the modification as shown in FIG. 7 of the drawings, the body member 12 is provided with an opening 144 through which a switch arm 146 extends and in which it is reciprocally mounted. An O ring 148 is positioned in the body member 12 surrounding the member 146 to provide a water tight seal. One end of a spring 150 abuts the inner side 154 of the body member 12 and a washer 152 on the member 146 provides an abutment for the opposite end of the spring. Thus, the spring is maintained in compression between the washer 152 and the inside 154 of the body 12.

Electrically connected to the member 146 is the conductor 60, as shown in FIG. 3 of the drawings, while the conductor 62 is coupled to a switch having an angular end 158 disposed to be contacted by an end portion 160 of the member 146. In operation line tension applied in the direction of the arrow A causes compression of the spring 150 thereby permitting the contacts 158 and 160 to complete an electrical circuit, as hereinbefore described in connection with FIG. 3 of the drawings. It will be understood in connection with FIG. 3 of the drawings the switch element 156 shown in FIG 7 is connected to a conductor 62, as shown in FIG. 3 of the drawings.

In the modification as shown in FIG. 8 of the drawings, a wire line connection member 162 projects from the body 12 and is provided with a loop 164 rigidly to connect the line 48 with the body member 12.

A conductor 166 also projects from the front of the body member 12 and is provided with a flat plate 168 which is adapted to deflect into engagement with an end 170 of another conductor 172. It being understood that the conductors 166 and 172 are substituted for the hereinbefore described conductors 34 and 36.

It will be understood that when the lure of the present invention is pulled through the water by line tension in the direction of the arrow A that the thin metal plate portion 168 of the conductor 166 deflects backwardly into engagement with the end 170 of the conductor 172 because of water pressure on the frontal portion of the plate 168. Thus, the conductors 166 and 172 form a switch equivalent to the switch elements 50 and 52 of the conductors 34 and 36 hereinbefore described.

In the modification as shown in FIG. 10 of the drawings, a pair of conductors 174 and 176 are coupled to the body 12 in a manner similar to the conductors 34 and 36 shown in FIG. 2 of the drawings. Additionally, this modification includes a loop member 178 which is similar to the loop member 42 shown in FIG. 2 of the drawings except that a short metal sleeve 180 is positioned over the non-conducting loop 178. In operation tension of the line 48 causes opposite ends of the sleeve 180 to engage the conductors 174 and 176 and thereby cause an electrical connection therebetween. It will be seen that opposite ends 182 and 184 of the sleeve 180 are normally spaced from the conductors 174 and 176, respectively, and that inward deflection of the conductors 174 and 176 toward each other by the inclined elements of the loop 178 causes the conductors 174 and 176 to be engaged with said opposite ends 182 and 184 of the sleeve 180.

It should be understood, of course, that the foregoing disclosures relate to only a preferred embodiment of the invention and that it is intended to cover all changes and modifications of the invention herein chosen for the purposes of the disclosure which do not constitute departures from the spirit and scope of the invention.

What is claimed is.

1. A sonic fishing lure comprising a hollow body; a battery therein; a sonic device electrically coupled to said battery; and switch means in serial relationship with said battery and said sonic device to complete a circuit for energizing said sonic device by energy from said battery; a fishing line coupled to said switch means, said switch means operably responsive to tension of said fishing line; a thermal flasher switch connected in parallel relationship with said switch means for intermittently energizing said sonic device by energy from said battery; a second switch in serial relationship with said thermal flasher switch; and means externally of said body for operating said thermal flasher switch.

2. The sonic fishing lure of claim 1 wherein: said switch means comprising a pair of adjacent conductors; and a non-conductor having converging portions engaging said adjacent conductors, said fishing line coupled to said non-conductor whereby tension of said fishing line forces said conductors together by means of said converging portions of said non-conductor.

3. The sonic fishing lure of claim 1 wherein: said switch means comprising a pair of conductors projecting from the frontal portion of said body member, one of said conductors having a stationary loop portion; the other of said conductors being of resilient material and extending normally centrally through said loop portion; said line connected to said last mentioned conductor whereby tension of said line causes deflection of said last mentioned conductor and causes it to contact the interior of said loop portion of the first mentioned conductor.

4. The sonic fishing lure of claim 1 wherein: said switch means comprising first and second conductors projecting from the frontal portion of said body member; a sliding member slidably mounted on said first mentioned conductor; a coil spring disposed to resist slidable motion of said member on said first mentioned conductor; said sliding member being coupled to said fishing line and having means engageable with said second mentioned conductor upon deflection of said spring by tension applied to said line.

5. The sonic fishing lure of claim 1 wherein: said switch means comprising a pair of conductors extending from the frontal portion of said body; and means engaging one of said conductors and coupled to said line and adapted to deflect said one conductor into engagement with the other conductor when tension is applied to said line.

6. The sonic fishing lure of claim 1 wherein: said switch means comprising a line connection member reciprocally mounted in the frontal portion of said body; sealing means surrounding said line connection member and hermetically sealed therearound to prevent water from entering said body; resilient means in connection with said line connection member; a conductor coupled thereto; and a second conductor engageable by said line connection member upon deflection of said line in connection therewith.

7. The sonic fishing lure of claim 1 wheren: said switch means comprising a line connection member movably mounted in the frontal portion of said body member; means resiliently urging said line connection member inwardly of said body; contact means inwardly of said body operable to be engaged by said line connection member; and resilient means tending to hold said contact means in one of two positions.

References Cited by the Examiner
UNITED STATES PATENTS

| | | | |
|---|---|---|---|
| 2,709,868 | 6/1955 | Simmons | 43—17.6 |
| 2,784,399 | 3/1957 | Smith. | |
| 2,939,240 | 6/1960 | Goodman | 43—17 |
| 3,074,049 | 1/1963 | Saliba et al. | 340—276 X |

SAMUEL KOREN, *Primary Examiner.*

D. J. LEACH, *Assistant Examiner.*